June 7, 1938.                H. T. LYMAN                2,120,136
                          INDICATING DEVICE
                        Filed June 20, 1936            2 Sheets-Sheet 1
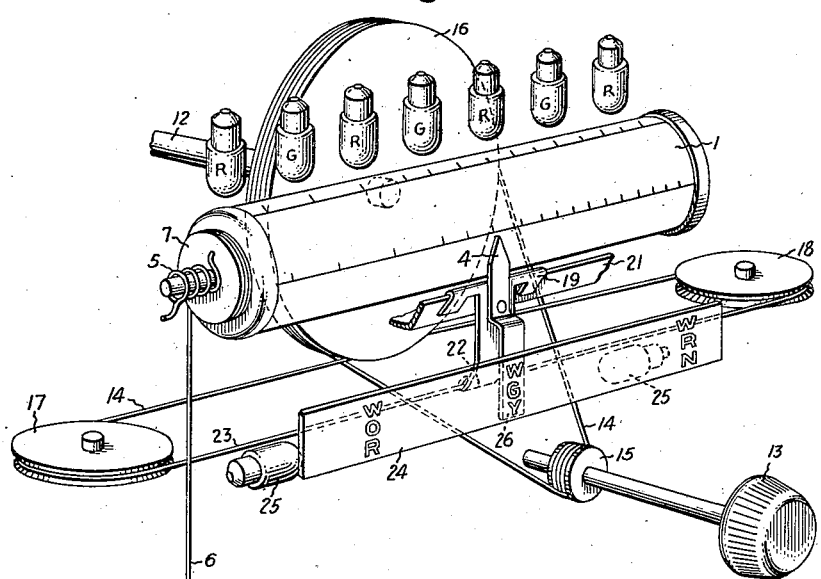
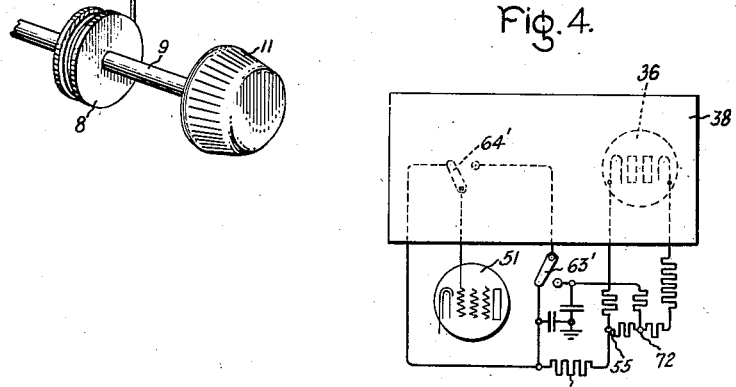
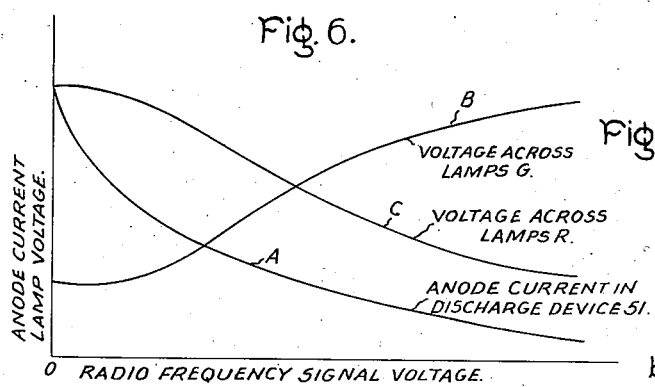
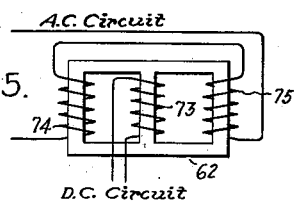
Inventor:
Harold T. Lyman,
by Harry E. Dunham
His Attorney.

June 7, 1938.  H. T. LYMAN  2,120,136
INDICATING DEVICE
Filed June 20, 1936    2 Sheets-Sheet 2

Inventor:
Harold T. Lyman,
by Harry E. Dunham
His Attorney.

Patented June 7, 1938

2,120,136

UNITED STATES PATENT OFFICE 2,120,136

INDICATING DEVICE

Harold T. Lyman, Milford, Conn., assignor to General Electric Company, a corporation of New York Application June 20, 1936, Serial No. 86,392

11 Claims. (Cl. 250—40)

My invention relates to indicating systems for high frequency receivers and more particularly to tuning indicating systems therefor. It has for one of its objects to provide an improved means for visually indicating the condition of tune, or resonance, of the receiver with a desired carrier wave.

A further object of my invention is to provide a visual tuning indicating system which co-operates with the dial mechanism of the receiver to effect an improved indication.

Another object of my invention is to effect such improved indication through change of the apparent color of the dial scale during the tuning operation.

In United States Patent No. 2,052,701 to Donald R. DeTar and which is assigned to the same assignee as my present application, is shown a dial mechanism having a translucent cylindrical dial illuminated from the rear and with which an index co-operates to provide an indication of the frequency or wavelength, to which the receiver is tuned. An object of my present invention is to provide an improved visual tuning indication by utilizing change in color of illumination of such a dial, the condition of resonance being indicated by the maximum change in color.

Figure 2:
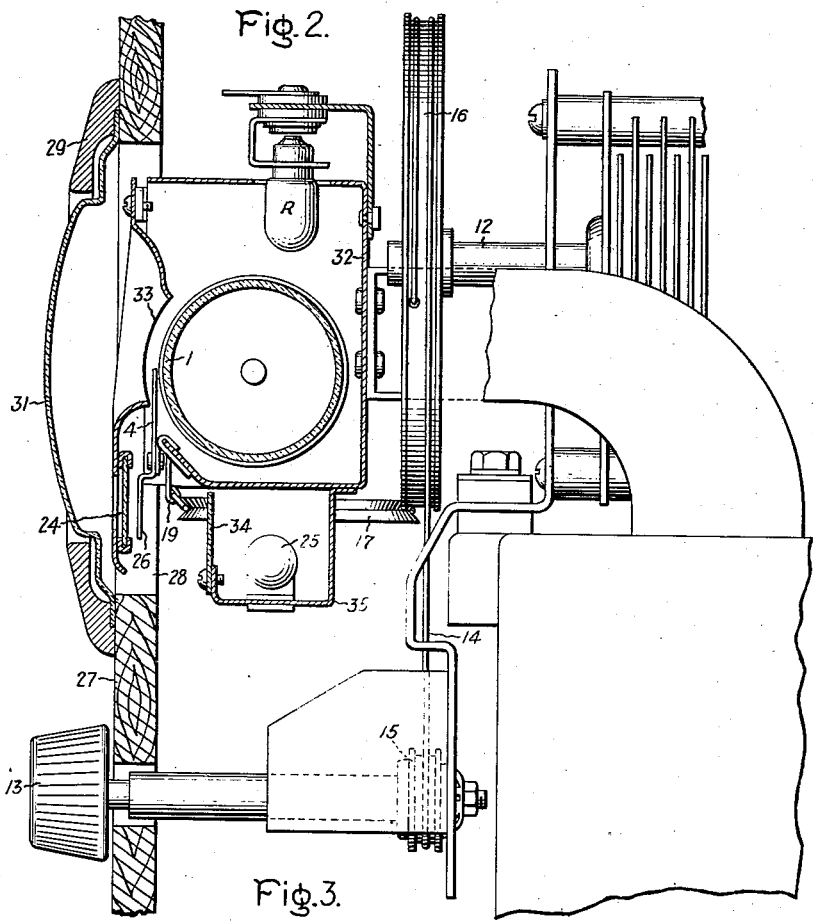
Figure 3:
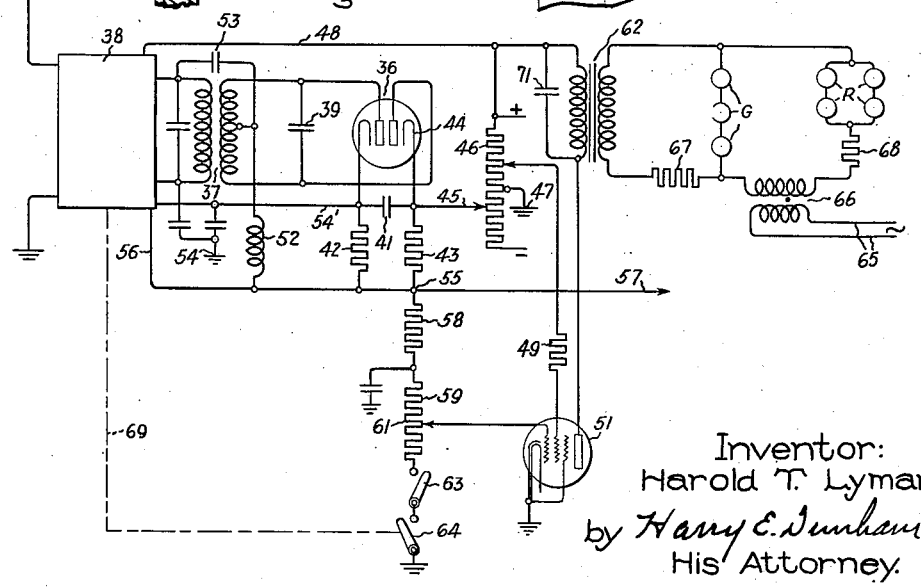

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawings in which Fig. 1 shows in perspective a dial mechanism utilized in accordance with my invention; Fig. 2 shows a view partially in section of a more complete embodiment of the dial mechanism; Fig. 3 shows one form of circuit for use in connection with the apparatus shown in Figs. 1 and 2; Fig. 4 is a modification thereof; Fig. 5 is a detail; and Fig. 6 represents certain characteristics pertaining to the operation of the circuit shown in Fig. 3.

Referring to Fig. 1 of the drawings, I have shown therein a cylindrical dial 1 having a number of scales extending longitudinally along the surface thereof one corresponding to each band of frequencies over which the receiver, with which my invention is associated, operates. An index member 4 is arranged to co-operate with any one of the scales on the drum 1, the drum 1 being rotatable to the different positions to cause any particular scale to co-operate with the index 4.

The drum 1 is biased to a certain position by means of a spring 5 from which position it is rotated by means of a belt 6, the respective ends of the latter being anchored to pulleys 7 and 8, the pulley 7 being fixedly mounted on the drum 1 and the pulley 8 being fixedly mounted upon a shaft 9 which may control the band change mechanism of the radio receiver. The shaft 9 is provided with a control handle, or knob 11, which may be grasped by the operator to operate the band change mechanism and simultaneously to rotate the drum through belt 6 to such a position that the proper dial scale on the drum 1 co-operates with the index 4. The tuning mechanism of the receiver, which may include a variable tuning condenser having a shaft 12, may be operated to effect the desired tuning operation by means of a control handle or knob 13. This handle 13 is connected with the shaft 12 of the tuning device through a belt 14, which extends over a number of pulleys 15, 16, 17, and 18. Pulley 15 is, of course, the driving member mounted upon the shaft of the control handle 13. Pulley 16 is the driven member and is mounted upon the shaft 12 of the tuning condenser. Pulleys 17 and 18 are merely idler pulleys arranged to guide the belt 14 in desired directions. The index member 4 is carried by a rider 19 which rides upon a bar 21 which, in turn, is arranged in parallel with the axis of the drum 1. This rider 19 is attached to the belt 14 as indicated at 22. The portion 23 of the belt 14, extending between pulleys 17 and 18, extends parallel with the bar 21 and hence the rider 19 is moved backward and forward along the drum as the tuning condenser is rotated from one of its extreme positions to the other. Thus the index member 4 moves over the corresponding scale with which it co-operates in accordance with the frequency to which the receiver is tuned.

The drum 1 is made of any suitable translucent material, preferably of light color, such as cream, or white, and is arranged to be illuminated from the rear by a number of lamps R and G. These lamps R and G of which seven are shown in the drawings, have any suitable distinctive colors, for example, red and green respectively, the red and green lamps being alternately spaced along the dial for uniform illumination thereof throughout the dial length. Of course, any desired number of these lamps may be employed. If in a particular application the dial be small, or the lamps large, a single lamp of each color may be sufficient, although for an extended dial I prefer a number of lamps spaced alternately along the dial as shown. By means presently to be described the energization of these lamps R and G is arranged to be controlled by the received signal so that as the receiver approaches resonance with a carrier wave the energization of one group of lamps, the group R, for example, is decreased and the energization of the group G is increased, this change in energization of the lamps causing an apparent change in color of the dial 1, the degree of change of this color constituting an indication of the condition of resonance of the receiver with the received carrier wave.

Beneath the drum 1 is shown a second scale 24 having station letters such as WRN, WGY, WOR which appear thereon. Preferably this scale, or tab, is opaque to light but the letters are translucent so that light from lamps 25 renders the letters visible from the front of the apparatus. The index 4 preferably is of some translucent colored material such as green celluloid and is provided with a tail 26 which extends in back of the scale 24, this tail being of just sufficient width to mask one group of station letters, such as the letters WGY in the position of the index shown in the drawings. Thus it will be observed that as the control handle 13 is rotated to tune the receiver for reception from a particular station, such for example as WGY, the drum 1 changes in its apparent color from red to green and at the same time the letters WGY change from white to green.

Fig. 2 is a view partially in section of a more complete embodiment of the dial mechanism. In this view it will be observed that the drum 1 is arranged in back of a panel 27 of the cabinet of the receiver, which panel is provided with an opening 28 which is covered by an escutcheon plate 29 and a transparent window 31. The drum 1 is mounted within a housing 32 having an aperature 33 therein through which a single scale of the drum 1 may be viewed. The index member 4 is shown projecting above the lower edge of aperture 33 and between the aperture 33 and the drum. In back of the housing 32 is shown the pulley 16 mounted on the shaft 12 of the tuning condenser. The belt 14 is shown extending over pulleys 15, 16 and idler puller 17 and carrying thereon the rider 19 for the index member 4. The lower end, or tail 26, of the index member 4 is shown as co-operating with the scale 24 carrying the station letters indicated in Fig. 1. This scale is illuminated by the lamps 25 through a translucent member 34, the latter of which diffuses the light uniformly along the scale 24.

It will be observed that the lamps 25 are substantially completely housed by means of members 34, 35, which extend throughout the length of the scale, and the bottom of the housing 32. The lamps R and G as shown in Fig. 1, for illuminating the drum 1, are mounted within the housing 32 as indicated by the lamp R shown in Fig. 2. It will be observed that the light from these lamps R and G passes through, and is diffused by the back wall of the cylinder and hence illuminates the drum substantially uniformly throughout its length. Preferably the interior of the housing 32 and that for the lamps 25 are painted white whereby these surfaces serve more efficiently to reflect the light toward the dial windows.

The scale 24 suitably comprises a removable tab which may have station letters thereon in accordance with the particular locality in which the receiver is to be used, an appropriate tab being inserted for each particular locality. Since this tab corresponds to but one band of received frequencies, such as the broadcast band, the lamp 25 need be energized only when the receiver is adjusted for operation in that band. This control of lamp 25 may conveniently be effected by a suitable switch (not shown) which is mechanically operated in unison with the band change switch of the receiver.

Fig. 3 shows a suitable circuit arrangement for controlling the energization of the lamps R and G. This circuit arrangement is one suitable, for example, for use in a superheterodyne receiver in which the electron discharge device 36 may comprise the second detector and transformer 37, the last intermediate frequency coupling transformer of the receiver, the primary winding of this transformer being coupled to the output of the earlier stages of the receiver. The earlier stages of the receiver are indicated by the rectangle 38.

The discharge device 36 is of the double diode type having its two anodes connected to the opposite ends respectively of the secondary winding of the transformer 37, the latter of which is tuned to the intermediate frequency by means of a condenser 39. The two cathodes of the discharge device 36 are connected together for high frequency currents by condenser 41 and for direct currents by resistances 42 and 43. The cathode 44 of the discharge device 36 is biased negatively with respect to ground by a tap connection 45 to the bleeder resistance 46 which is connected across the power supply, not shown, for the receiver, an intermediate point of which bleeder resistance is connected to ground at 47. Other points of the bleeder resistance are connected to other portions of the receiver to be energized, as for example through conductor 48 to the discharge devices of the equipment represented by rectangle 38 and through resistance 49 to the screen grid of an electron discharge device 51. The point between resistances 42 and 43 is connected through a choke coil 52 to the midpoint on the secondary winding of transformer 37 thereby to constitute a return path for direct currents flowing in the two diodes. The midpoint of the secondary winding of the transformer 37 is connected to one terminal of the primary through a condenser 53, the opposite terminal of the primary being grounded for high frequency currents as indicated at 54. In this way the alternating current path for one diode of the discharge device 36 extends from ground at 54 through the primary winding of transformer 37, condenser 53, upper half of the secondary winding of this transformer, lefthand diode of discharge device 36, condenser 41, connection 45, and a portion of the bleeder resistance to ground at 47. Similarly the alternating current path for the other diode extends through primary winding of transformer 37, condenser 53, lower half of the secondary winding 37, righthand diode, connection 45, and a portion of bleeder resistance 46 to ground at 47. With such a connection and with the primary and secondary of transformer 37 both tuned to the fixed intermediate frequency of the receiver the voltages applied to the two diodes are equal when the frequency of currents applied to transformer 37 is that to which this transformer is tuned. If this frequency increases the voltage applied to one diode increases while that applied to the other diode decreases and of course vice versa if the frequency decreases. Thus when the receiver is tuned accurately to the received carrier wave the unidirectional voltages on resistances 42 and 43 are equal and hence no voltage appears across condenser 41. If the receiver be tuned to one side or the other of resonance with the received carrier wave, however, then the voltage on one of the two resistances 42, 43 will be larger than that which appears on the other with the result that conductor 54' is positive or negative with respect to conductor 45 by an amount dependent upon the frequency supplied to transformer 37. Conductor 54' may therefore be employed to supply voltage to suitable equipment in apparatus 38 whereby the local oscillator of the receiver may be controlled in frequency in such a way as to maintain a constant intermediate frequency upon transformer 37.

The point 55 between resistances 42 and 43, however, is negative with respect to ground whenever a signal is received and by an amount dependent upon the intensity of the received signal. This point may therefore be connected through conductor 56 to the grids of amplifiers in apparatus 38 for automatic volume control purposes.

Since the audio signal voltage appears at this point it may, if desired, be connected through conductor 57 to suitable output apparatus such as an audio amplifier.

In accordance with my invention the voltage at this point is employed to control the visual indication lamps R and G. To this end the voltage at the point 55 is supplied through a suitable resistance capacity filter 58, 59 to a potentiometer 61, the variable contact of which is connected to the grid of discharge device 51. The cathode of discharge device 51 is grounded and the anode is connected through the direct current winding of a saturable reactor 62 to the positive end of bleeder resistance 46. This discharge device may be one of any suitable type, such as one of the 6C5 type, but I prefer to employ one commonly known on the market as the 6K7 for reasons which will hereinafter appear.

Switches 63 and 64 are employed to control the sensitivity of response of the discharge device 51 in a manner presently to be described, but for present purposes may be assumed to be in the closed position.

The lamps R and G are arranged to be energized from a suitable source of alternating current 65 through a transformer 66, the lamps R being connected in series with the alternating current winding of reactor 62 and secondary winding of transformer 66 through resistances 67 and 68 and the lamps G being connected in shunt with the alternating current winding of the saturable reactor 62 through resistance 67; the lamps G, of which there are three, being connected in series, and the lamps R of which there are four, being connected in parallel series relation, there being two parallel groups of two lamps in series.

The operation of my invention will now be described. Let us assume that the receiver is detuned from resonance and that no carrier wave is being received, and further that switches 63 and 64 are closed. No voltage appears on resistances 42 and 43 and the point 55 is negative with respect to ground only by the amount of the fixed bias which appears on conductor 45. A portion of this bias is supplied through potentiometer 61 to the grid of the discharge device 51. A large unidirectional current, however, flows in the anode circuit of discharge device 51 which saturates the iron core of reactor 62 thereby causing the alternating current winding of this reactor to have low impedance, which in turn substantially short-circuits the three green lamps in series. This short circuit causes a large current to flow through the alternating current winding of reactor 62, secondary winding of transformer 66, and the two groups of lamps R, thereby causing these lamps to be lighted and the dial of the indicating equipment to appear red.

Now let us assume that the tuning control knob 13 is rotated through a position where the receiver tunes with a carrier wave. As it approaches resonance voltage appears on resistance 43 and the point 55 becomes increasingly negative. This causes the control grid of discharge device 51 to be increasingly negative and the anode current of this device to reduce. The impedance of the alternating current winding of reactance 62 then increases thereby causing a reduction in current in the lamps R and a corresponding increase in current in the lamps G. As the condition of exact resonance is approached the lamps R become completely extinguished and the lamps G become brilliantly lighted whereby the color of the dial scale changes from an intense red to an intense green, the degree of change in color, however, being of a marked maximum when the receiver is in exact tune.

A further understanding of this operation may be had by reference to the characteristics of Fig. 6 in which the radio frequency input signal voltage is plotted as abscissa and the voltage on the different lamps R and G and also anode current in discharge device 51 are plotted as ordinates. Curve A represents the change in anode current in discharge device 51 with radio frequency voltage when the receiver is tuned to resonance at the frequency of the radio frequency voltage. Curve B represents the change in voltage across lamps G with change in radio frequency signal voltage and the curve C represents the change in voltage on the lamps R. It will be observed from the substantially flat portions of curves B and C at the left end thereof that as the tuning control is varied toward the resonance position to a point that a signal just begins to appear, there is at first very little change in voltage on the lamps although a substantial change in current in discharge device 51 occurs. This is advantageous since it prevents undesired noise currents and the like from affecting the operation of the signal lamps. Upon a further increase in received radio frequency signal voltage, however, the voltage on the lamps G increases gradually in accordance with the curve B and that on the lamps R decreases in accordance with the curve C. The condition of exact resonance corresponds to a point near the right end of the curves at which all of the curves having a considerable slope whereby a marked maximum in degree of change in color of the dial occurs when the receiver is in exact resonance, this marked maximum greatly facilitating the accuracy by which the receiver may be tuned in accordance with the visual indication.

To this end it is highly desirable that a discharge device of the type known as the 6K7 be employed at 51 since it is such a discharge device that has a characteristic of the form indicated at A and in which the anode current gradually decreases even until the bias voltage applied thereto approaches a very strong negative value.

Resistance 67 is included in the circuit to aid in producing the substantial horizontal portion of curve B which appears near the left end thereof thereby reducing the effect of undesired noise currents upon the operation of the lamps. Resistance 68 is inserted for the purpose of increasing the slope of the curves B and C near the right ends thereof.

When the receiver is operating in the short wave bands, for example, where the received signal intensity is fairly weak, it is desirable that the entire voltage of point 55 be applied to the grid of the discharge device 51 thereby to cause the color tuning device to operate with maximum sensitivity. For this reason, in accordance with my invention, switch 64 is mechanically connected as indicated by the dot and dash line 69 with the band change switch of the receiver whereby this switch 64 is arranged to be open when the receiver is adjusted for operation in the short wave bands. During operation in the long wave bands, or in a band where nearby stations of high power are to be received, it is desirable to reduce the amount of voltage applied to the discharge device 51 so that nearby stations do not cause the dial to appear continuously green. When the band change switch is adjusted for operation in such a band switch 64 is closed thereby to reduce the sensitivity of the color tuning device. Switch 63, however, is provided and may be manually controlled from the panel of the radio receiver, or from the receiver chassis deck, so that if desired the potentiometer circuit may be open even when operating in such a band thereby to increase the sensitivity of response of the visual indicating equipment.

Filter 58, 59 may be provided between the grid of discharge device 51 and the point 55 to prevent hum voltages of the frequency of source 65 or harmonics thereof, appearing on the grid of discharge device 51 from being supplied through the automatic volume control conductor 56 to the other discharge devices of the radio receiver. The direct current winding of reactor 62 is shunted by a condenser 71 to suppress voltages representing harmonics of the currents supplied from source 65. This condenser also aids in preventing any self-oscillation of tube 51 which may tend to occur by reason of the high current reactance gradient of the direct current winding of reactor 62 in cooperating with the time constant of filter 58 and 59 and that of the main power supply circuit (not shown) to bleeder resistance 46.

Fig. 4 shows a modification of the sensitivity controlled circuit of Fig. 3. In this figure switch 64' is arranged for mechanical control with the band change switch of the receiver and in the position shown connects the grid of discharge device 51 through resistance 58 to the point 55 on the diode load resistance. This is the condition for maximum sensitivity of the color tuning control equipment as during operation in a short wave band. When the switch 64' is in its alternate position the grid is connected to the diode load resistance either at point 55 or at point 72 of lower voltage dependent upon the position of switch 63' which is manually controlled. Thus in the broadcast band the sensitivity of the lamp control equipment is dependent upon the manually controlled switch 63'.

Fig. 5 shows the arrangement of windings upon the reactor 62, the winding 73 upon the middle leg of the core being the direct current winding and the windings 74 and 75 being the alternating current windings. It will be observed that the fundamental component of voltage produced by windings 74 and 75 oppose each other in winding 73 but that even harmonic components thereof produce voltages across the winding 73. Condenser 71 of Fig. 3 reduces these voltages as they appear upon the bleeder resistance or upon the anode of discharge device 51.

I have found that the device constructed as described markedly increases the facility of tuning the receiver to exact resonance with a received carrier wave. While any suitable type of discharge device may be employed at 51 it is of importance that it be one capable of varying the voltage on the lamps markedly in the region of resonance. The lamps R and G may be of the incandescent type, their voltage ratings being such with respect to the voltage applied thereto that the brilliance of illumination produced thereby varies rapidly with the change in voltage which occurs as the tuning control passes through the region of resonance. That is, the brilliance of illumination of an incandescent filament lamp increases at a progressively increasing rate with respect to applied voltage. The voltage applied to lamps G and R when the receiver is in approximate resonance with a signal of average intensity may therefore be such that the brilliance of illumination changes rapidly in this region of applied voltages. Thus in the region of resonance the brilliance of illumination of lamps R rapidly decreases while that of the lamp G rapidly increases. The apparent color of the scale thus varies to a marked extent during movement of the tuning control through a position of resonance, the degree of change being at a definite maximum when the tuning control is at exact resonance.

While I have shown a particular embodiment of my invention it will of course be understood that I do not wish to be limited thereto since different modifications both in the circuit arrangement and in the instrumentalities employed may be made, and I contemplate by the appended claims to cover any such modifications as fall within the true spirit and scope of my invention.

What I claim as new and desire to secure by Letters Patent of the United States is:

1. The combination, in a dial mechanism for a variable tuned high frequency receiver, of an elongated dial aperture, an elongated dial visible through said aperture, an index movable along said dial in accordance with the frequency to which said receiver is tuned to respond, and means operative when said index is in any position of said dial to produce a marked maximum of change in the apparent color of the entire dial in response to a received signal when said receiver is in exact resonance with said signal.

2. The combination, in a dial mechanism for variably tuned high frequency receivers, of a dial, a plurality of sources of illumination for said dial, each of said sources being arranged when energized to illuminate the entire dial substantially uniformly, an index movable along said dial in accordance with the frequency to which said receiver is tuned, and means responsive to a received signal for decreasing the energization of one of said sources of illumination and for increasing the energization of the other at any position of said index.

3. The combination, in a dial mechanism for variably tuned high frequency receivers, of a dial having an extended scale, an index movable along said scale as said receiver is tuned through a predetermined range of frequencies, and means to change the apparent color of the entire dial dependently upon the intensity of the received signal, said means including a plurality of sources of light to illuminate said dial, said sources producing light of different color, and means for reducing the energization of either of said sources when the energization of another is increased.

4. The combination, in a dial mechanism for radio receivers, of a dial, a pair of lamps to illuminate said dial and illuminating substantially equally all portions of said dial, said lamps producing light of different color, and means responsive to the intensity of the received signal to energize said lamps inversely whereby the color of said dial appears to change upon reception of a signal.

5. The combination, in a dial mechanism for a variably tuned radio receiver, of a dial, means to illuminate said dial, said means comprising a plurality of lamps of different color, means responsive to the intensity of a signal to decrease the energization of certain of said lamps of one color and simultaneously to increase the energization of certain other of said lamps of a different color, said lamps being so positioned that the entire dial is illuminated irrespective of the color of the lamp energized, said means operating during variation of the tuning of said receiver to change the apparent color of said dial from said different color to said one color, in degrees dependent upon the intensity of a received signal, said degree of change in color being maximum when the receiver is in exact resonance with said received signal.

6. The combination, in a dial mechanism for a variably tuned high frequency receiver, of a dial having an elongated scale, an index cooperating therewith, said entire scale being visible to the operator of said mechanism, means to tune said receiver and simultaneously to produce corresponding relative movement of said index and scale, a plurality of sources of illumination, one of said sources being normally energized to illuminate the entire length of said scale in color and another of said sources being arranged when energized to illuminate the entire length of said scale in a different color, and means operative upon tuning said receiver to a received signal to decrease the energization of said one source and to increase the energization of the other sources whereby the color of said illumination changes, and means whereby the degree of said color change is maximum when said receiver is in exact tune with the received carrier wave.

7. The combination, in a dial mechanism for a variable tuned high frequency receiver, of an elongated dial aperture, an elongated dial visible through said aperture, a circuit including a lamp arranged to illuminate said dial with a color, an index movable along said dial in accordance with the frequency to which said receiver is tuned to respond, and means operative when said index is in any position of said dial for controlling said lamp circuit to produce a marked maximum of change in the apparent color of said dial in response to a received signal when said receiver is in exact resonance with said signal and means including a member in said lamp circuit to prevent noise currents of a substantial value and below a predetermined value from affecting the apparent color of said dial.

8. In combination, a dial for a variably tuned high frequency receiver, a plurality of incandescent lamps for illuminating said dial, different of said lamps being of distinctive colors and all of said lamps being arranged to illuminate the entire dial, means to supply voltage to said lamps in accordance with the intensity of signal received in said receiver, the voltage applied to a lamp of one color increasing with signal and that applied to a lamp of different color decreasing with said signal, said changes in voltage being sufficiently great as the tuning of the receiver is varied through resonance with a desired signal to cause a marked maximum of apparent change in color of said dial when the receiver is in exact resonance with the desired carrier.

9. The combination, in a dial mechanism for radio receivers, of a dial, a pair of lamps of different color to illuminate said dial, and means responsive to a received signal to reduce the energization of one of said lamps and increase the energization of another of said lamps, and means to maintain the energization of both of said lamps substantially constant when said received signal is of less than a predetermined amplitude, the change in energization produced by said first means being gradual as said signal increases in amplitude above said predetermined amplitude and through the range of maximum signals received whereby as said receiver is tuned over a range of frequency the change in color of said dial has a distinct maximum when said receiver is adjusted for exact resonance with a received carrier wave.

10. The combination, in a dial mechanism for radio receivers, of a dial, a pair of lamps of different color arranged to illuminate said dial, an electron discharge device having a grid and an anode circuit, means to supply to said grid a voltage varying in response to the intensity of signals received in said receiver, the current in the anode circuit of said discharge device varying substantially in magnitude throughout the entire range of intensities of received signals, and means responsive to said current to vary oppositely the illumination of different ones of said lamps, said variation being substantially imperceptible during variations of received signal intensities when said intensities are less than a predetermined minimum value corresponding to the intensity of received noise currents and increasing in the range of intensities for desired signal reception.

11. The combination, in a dial mechanism for radio receivers, of a dial, a pair of lamps of different color arranged to illuminate said dial, an electron discharge device having a grid and an anode circuit, means to supply to said grid a voltage varying in response to the intensity of signals received in said receiver, the current in the anode circuit of said discharge device varying at first rapidly and then more gradually as said signal intensity varies from a minimum to a maximum and means to vary the current in said lamps oppositely in response to variation of current in said anode circuit, said variations in current in said lamp occurring during reception of signals having intensities in the range of maximum intensities of signals to be received.

HAROLD T. LYMAN.